(12) United States Patent
Sotnikov

(10) Patent No.: US 10,101,906 B2
(45) Date of Patent: Oct. 16, 2018

(54) METHOD, DEVICE AND SYSTEM FOR DATA ENTERING AND DISPLAYING ON TOUCH SCREEN DISPLAY

(71) Applicant: Evgeniy Albertovich Sotnikov, Moscow (RU)

(72) Inventor: Evgeniy Albertovich Sotnikov, Moscow (RU)

(73) Assignee: LIMITED LIABILITY COMPANY "1C WEARABLE", Moscow (RU)

( * ) Notice: Subject to any disclaimer, the term of this patent is extended or adjusted under 35 U.S.C. 154(b) by 477 days.

(21) Appl. No.: 14/877,953

(22) Filed: Oct. 8, 2015

(65) Prior Publication Data
US 2017/0038967 A1    Feb. 9, 2017

Related U.S. Application Data

(63) Continuation of application No. PCT/RU2015/000489, filed on Aug. 6, 2015.

(51) Int. Cl.
| | |
|---|---|
| G06F 3/0488 | (2013.01) |
| G06F 3/0484 | (2013.01) |
| G06F 3/0482 | (2013.01) |

(52) U.S. Cl.
CPC ........ G06F 3/04886 (2013.01); G06F 3/0482 (2013.01); G06F 3/04842 (2013.01); *G06F 2203/04803* (2013.01)

(58) Field of Classification Search
CPC . G06F 3/0482; G06F 3/04886; G06F 3/04842
See application file for complete search history.

(56) References Cited

U.S. PATENT DOCUMENTS

| | | | | |
|---|---|---|---|---|
| 6,327,384 | B1* | 12/2001 | Hirao | G06K 9/3208 |
| | | | | 382/171 |
| 7,429,993 | B2 | 9/2008 | Hui | |
| 7,844,914 | B2 | 11/2010 | Andre et al. | |
| 2008/0284744 | A1 | 11/2008 | Park et al. | |
| 2012/0242582 | A1* | 9/2012 | Choi | G06F 3/0233 |
| | | | | 345/169 |
| 2013/0298071 | A1 | 11/2013 | Wine | |
| 2014/0181721 | A1* | 6/2014 | Buck | G06F 3/04886 |
| | | | | 715/773 |

* cited by examiner

*Primary Examiner* — Li P Sun
(74) *Attorney, Agent, or Firm* — BCF LLP

(57) ABSTRACT

The claimed invention relates to the method of data entering and displaying on devices equipped with touch screens using the Graphic User Interface (GUI) comprising a virtual keyboard providing interaction of a user with device. The claimed effect is reached due to the method of entering and displaying of alphanumeric and other graphical symbols on the electronic device touch screen comprising the following steps: generate on a device touch screen a virtual keyboard consisting of data input/output virtual keys, and each virtual key comprises the input symbol sample and the field of displaying of the entered data; determine user interaction with the said virtual keyboard; and arrange and display on the device display in the virtual key field of displaying of the entered data symbols entered by the user using the said virtual keyboard.

14 Claims, 4 Drawing Sheets

METHOD, DEVICE AND SYSTEM FOR DATA ENTERING AND DISPLAYING ON TOUCH SCREEN DISPLAY

CROSS-REFERENCE TO RELATED APPLICATIONS

This application is a continuation of International Application No. PCT/RU2015/000489 filed on Aug. 6, 2015, the entirety of which is incorporated herein by reference.

FIELD OF THE INVENTION

The claimed invention relates to the method of data entering and displaying on devices equipped with touch screens using the Graphic User Interface (GUI) comprising a virtual keyboard providing interaction of a user with device.

BACKGROUND

Nowadays, there are numerous methods of data entering using touch displays. As of today, the main problem for users is typing of text data on small screens, this problem is particularly relevant for users of portable devices, especially smartwatch and mobile phones.

The method of transparent window displaying to enter data on the display is known (U.S. Pat. No. 7,429,993, Microsoft Corporation, 30 Sep. 2008) which allows generating on the device screen of a data-comprising transparent field being superimposed on the displaying field on the screen.

The method of information entering for small displays is known (application US 2013298071, Jonathan Wine, 7 Nov. 2013) using the transparent field allowing data entering by symbol contours' repeating.

There is a method of data entering on a touch display using a window displaying the section of the general virtual keyboard being manipulated by the user while typing (application US 2008284744, Samsung Electronics Co. Ltd., 20 Nov. 2008).

There is a method of enhanced data entering on the user's device using generation of a symbol-prompting field within the virtual keyboard field (U.S. Pat. No. 8,633,895 B2, Samsung Electronics Co. Ltd., 21 Jan. 2014).

There is a method of symbols entering through a virtual keyboard using a field of superposition onto the main GUI keyboard which allows scaled-up displaying of the data being entered (application US 2010211904, LG Electronics INC, 19 Aug. 2010).

Also, several software products are known developed specifically for SMS typing on touch display devices.

Software applications, e.g., ABC, SMS & Notes for SmartWatch 2, ComfortTap, Keyboard-Relief for Smart-Watch, MessagEase Keyboard, Cellular input method allow data entering using a virtual keyboard with displaying of the data being entered in the special zone located separately from the keyboard field.

Disadvantage of the known concepts of data entering and displaying on touch displays is the inefficient use of the whole display field resulting either in decrease of accuracy of recognition of the symbols being entered or in limitation of data displaying on small screen devices.

SUMMARY

The claimed invention objective is offering of GUI comprising a virtual keyboard which would provide usage of the same screen fields intended both for text entering and for the text displaying.

The technical effect is increase of the accuracy of recognition of the user-entered symbols due to usage of the whole display field.

The claimed effect is reached due to the method of entering and displaying of alphanumeric and other graphical symbols on the electronic device touch screen comprising the following steps:
  generate on a device touch screen a virtual keyboard consisting of data input/output virtual keys, and each virtual key comprises the input symbol sample and the field of displaying of the entered data;
  determine user interaction with the said virtual keyboard; and
  arrange and display on the device display in the virtual key field of displaying of the entered datasymbols entered by the user using the said virtual keyboard.

In another embodiment, the virtual key field of displaying of the entered data allows displaying of one or several output symbols without their intercrossing.

In another embodiment, the symbols displayed in the field of displaying of the entered data do not intersect one or more virtual key symbol samples.

In another embodiment, virtual keys divide the display field into sections.

In another embodiment, the sections have contact zones with each other.

In another embodiment, the virtual key entered data displaying fields are superposed in horizontal direction.

In another embodiment, the user-entered data displaying zone locating above and/or between and/or under the virtual key symbol samples.

In another embodiment, the virtual key entered data displaying fields are superposed in vertical direction.

In another embodiment, the user-entered data displaying zone locate to the left of and/or between and/or to the right of the virtual key symbol samples.

In another embodiment, one or more symbol samples located in the virtual key zone do not transcend beyond the virtual key boundaries.

The claimed invention shall also be embodied using the alphanumeric and other graphical symbols entering and displaying on touch screen of device comprising one or more processors and memory, and the memory comprises machine-readable instructions, which being executed by at least one processor, implement the following steps:
  generating on a device touch screen a virtual keyboard consisting of data input/output virtual keys, and each virtual key comprises the input symbol sample and the field of displaying of the entered data;
  user interaction recognition with at least one virtual key of said virtual keyboard; and
  arranging and displaying on the device display the symbols entered by the user using the said virtual keyboard in the said virtual key field of displaying of the entered data.

The claimed invention shall also be embodied using the system of alphanumeric and other graphical symbols' entering and displaying on touch screen comprising one or more processors and memory, wherein the memory comprises machine-readable instructions, which being executed by at least one processor, implement the following steps:
  generating on a device touch screen a virtual keyboard comprising data input/output virtual keys, and each virtual key comprises the input symbol sample and the field of displaying of the entered data;

user interaction recognition with at least one virtual key of said virtual keyboard;
and
arranging and displaying on the device display the symbols entered by the user using the said virtual keyboard in the said virtual key field of displaying of the entered data.

DETAIL DESCRIPTION OF THE INVENTION

Figure 1:
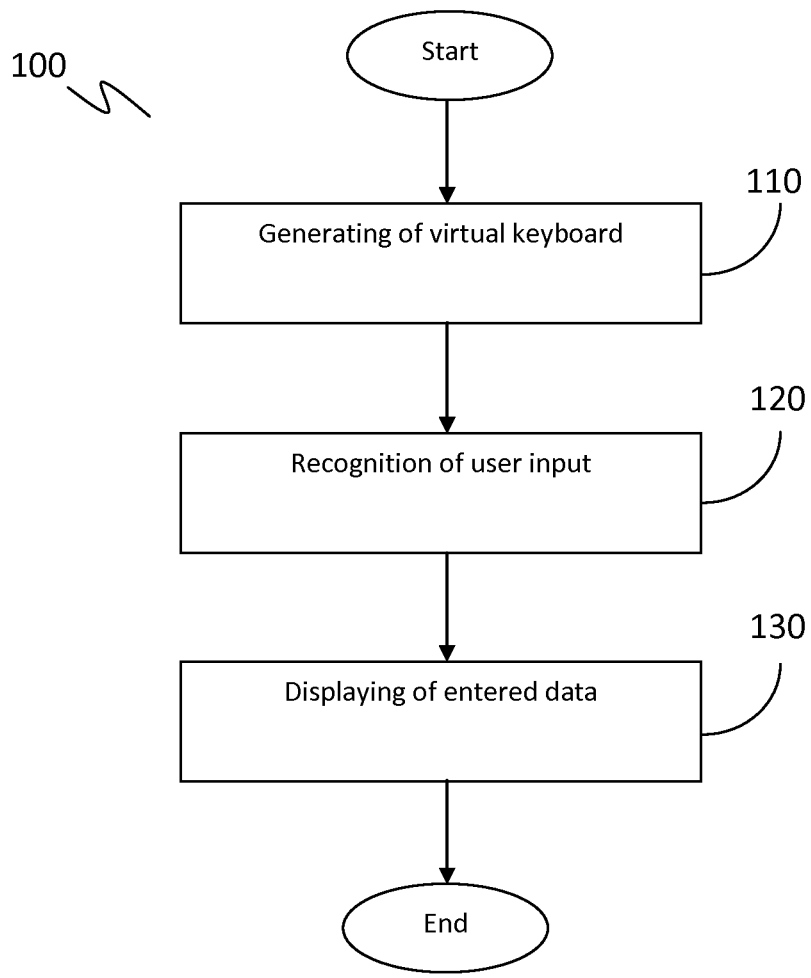
FIG. 1 shows the general diagram of the method of data entering and displaying according to the claimed invention.

FIG. 1 shows general stages of the claimed method 100, in particular, stage 110 of virtual keyboard generating, stage 120 of recognition of the user interaction with virtual keyboard, and stage 130 of the entered data displaying.

Figure 2:
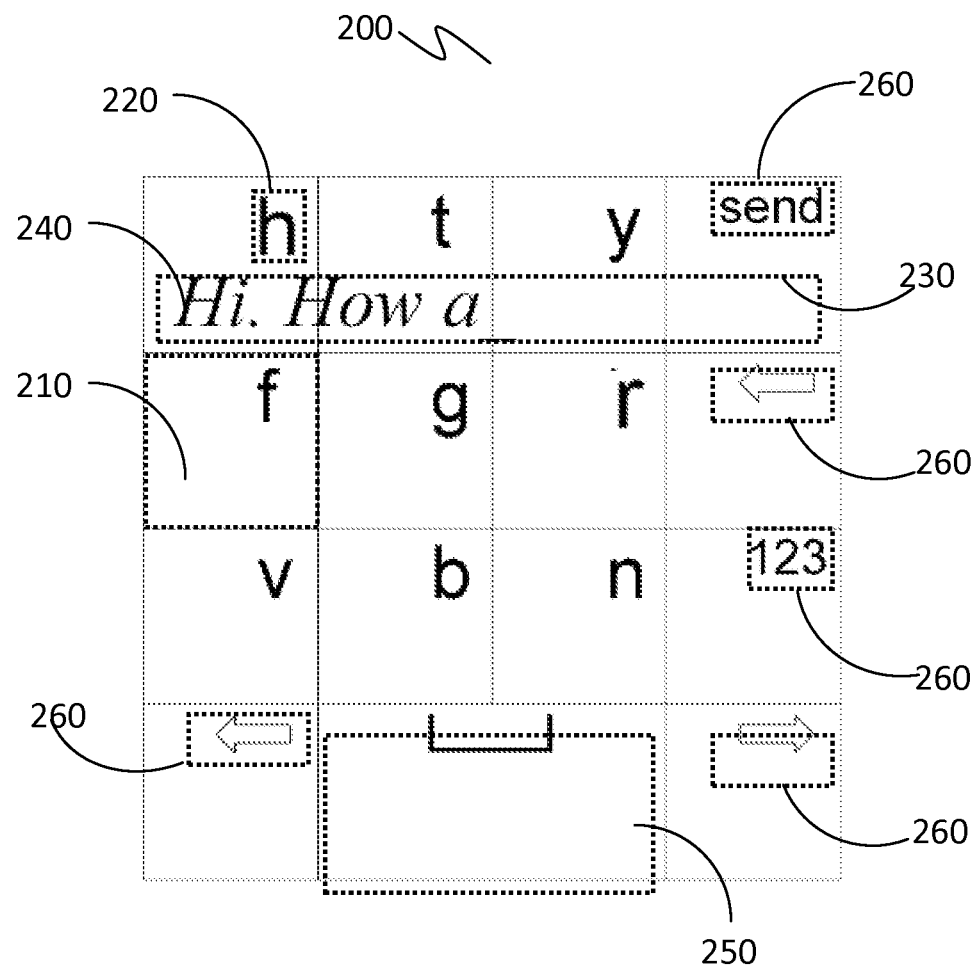
FIG. 2-FIG. 3 shows the display field comprising the virtual keyboard representation.
Figure 3:
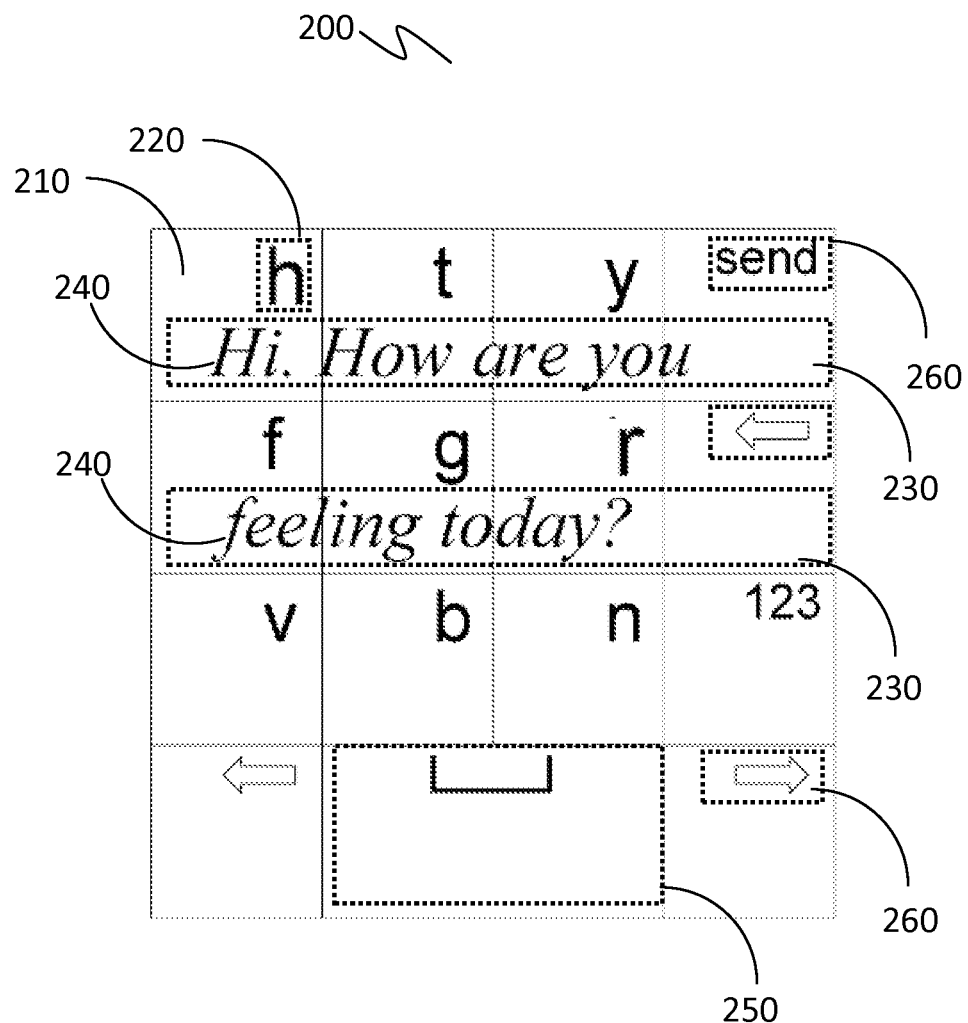

At stage 110, a virtual keyboard is generated, which is displayed on the user device display. FIG. 2 and FIG. 3 show examples of virtual keyboard 200. The generated virtual keyboard 200 consists of a set of virtual keys 210 being the virtual elements of data input and output simultaneously. Each virtual key 210 comprises the image of separate symbol 220 or a group of symbols, or graphical displaying of functional command 260.

The field of data input using virtual keyboard 200 is the section of touch screen surface or the ensemble of touch screen surface sections (set of pixels) outlined (used) by a computer program for entering by a user to an electronic computing device through interactions (touch) with a touch screen in the specified fields which determine virtual keys 210, of alphanumerical and/or other symbolic information, the samples of which 220 are displayed in this field.

The virtual key field of displaying of the entered data 230 is the section of touch screen surface or the ensemble of touch screen surface sections (set of pixels) outlined (used) by a computer program for displaying (visualization) of alphanumeric and/or other symbolic data 240 intended for visual sensing by a user.

The field 230 is located inside each virtual key 210, in particular, FIG. 2 and FIG. 3 show field 230 under the symbol samples 220 of keys 210. The virtual key field of displaying of the entered data 230 allows displaying of one or several output symbols 240 without their intercrossing and also without their intersecting with one or several symbol samples 220, 260 of the screen keys 210.

The said one or several symbol samples 220 do not intercross and stay within the boundaries of input field comprising these symbols. These symbols 220 are samples (designations) for a user. Pressing by a user of field of screen key 210 is interpreted by a program embedded in an electronic computing device as user's intention to display in the field 230 the symbol 240 associated with the sample 220.

The virtual keyboard 200 structure is arranged to divide the whole available field of the electronic device display into sections, each of which will be assigned to be a virtual key 210. The said sections-keys 210 are preferably of square and/or rectangular shape and have contact zones with each other. At contact in the horizontal direction of several virtual keys 210 their fields of displaying of the entered data 230 contact and form the single field 230.

In another embodiment, the symbol samples 220 of virtual keys 210 may be arranged so that the single field of displaying of the entered data 230 would be formed in the vertical direction, in particular, such option of the keyboard is used for entering of alphanumerical information of Asian languages, e.g., Chinese, Japanese, etc.

When superposing of fields 230 in the horizontal direction as shown in FIG. 2 and FIG. 3, the data entered by a user is located above and/or between and/or under symbol samples 220 of virtual keys 210 related to the row which contains inputted data.

When superposing of said fields 230 in the vertical direction, the data inputted by a user is located to the left and/or between and/or to the right of symbol samples 220 of virtual keys 210.

The symbol samples 220 of virtual keys 210 do not transcend the boundaries of a virtual key.

The virtual keys 210 also comprise displaying of symbols 260 depicting functional commands, for example, deleting of the entered symbols 240, changing of virtual keys 210 for entering of numerical data or displaying of keys 210 with other alphabetic symbols 220 other than ones being displayed before activation of a key 210 with the corresponding symbol 260.

Some virtual keys 250 can occupy the screen field larger than the rest of the keys, e.g., "the space" key, but in other embodiments all virtual keys 210 can be made equal in size.

The information being produced in the field 230 can graphically and/or stylistically differ from the symbol samples 220 of virtual keys 210.

Figure 4:
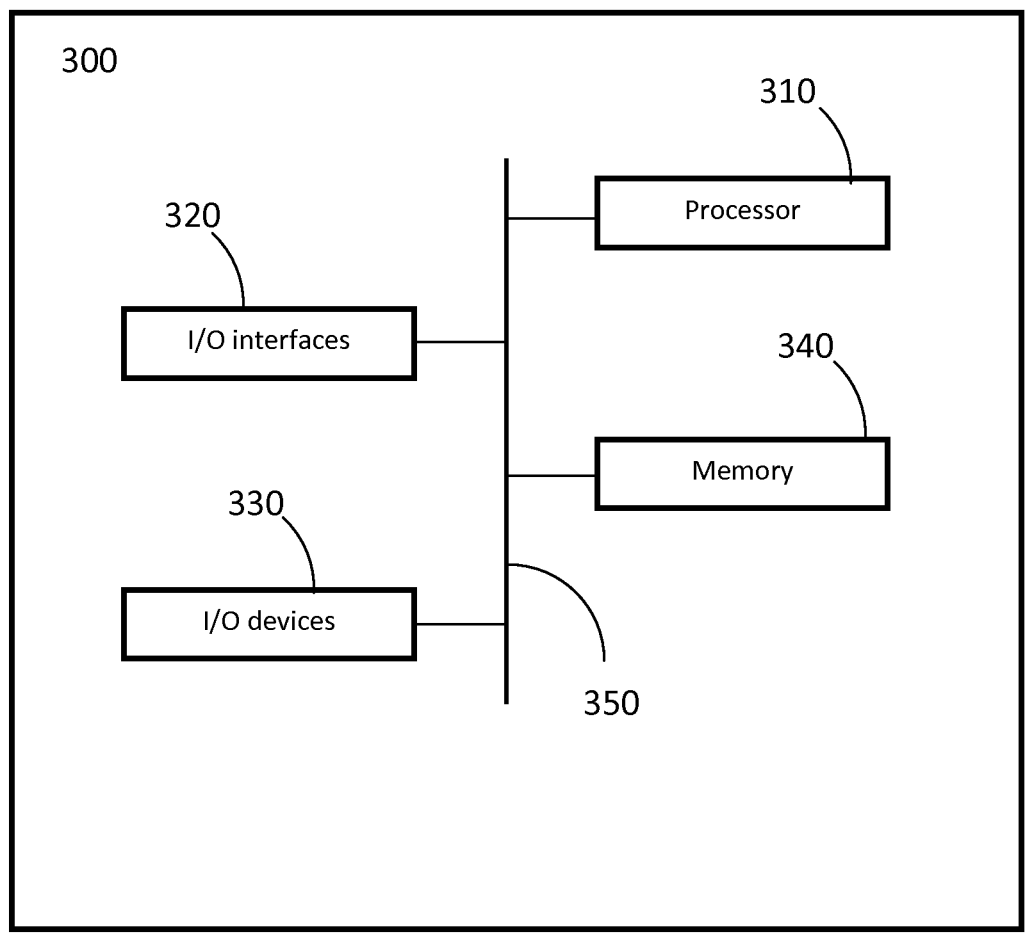
FIG. 4 shows the general diagram of data entering and displaying device according to the claimed invention.

FIG. 4 shows the general diagram of a device 300 displaying the virtual keyboard 200 on a touch display. The device 300 comprises one or more processors 310, input/output (I/O) interfaces 320, I/O devices 330 and memory 340 integrated be means of a bus 350. The memory 340 can constitute, but not limited to, the following: read-only memory (ROM), or random access memory (RAM), or a hard disk drive (HDD), or an external machine-readable medium, or combinations thereof. External machine-readable data medium shall be selected from the following group: a USB-flash drive, a memory card, an optical disk, a mini-disk, an external HDD or other medium type suitable to be used in the device 300.

The memory 340 of the device 300 comprises machine-readable commands executed by one or more processors 310, which being executed by one or more processors 310 implement stages, in which perform generating on the touch screen of the device 300 of a virtual keyboard 200 consisting of data input/output virtual keys 210, and each virtual key comprises the input symbol sample 220 and field 230 of displaying of the data entered, recognition of user interaction with the said virtual keyboard 200, and arranging and displaying on the device 300 display in the field 230 of virtual keys 210 of symbols 240 entered by the user through the virtual keyboard 200.

The claimed system of entering and displaying of alphanumerical and other graphical symbols on the device 300 touch screen represents the ensemble of GUI displaying the virtual keyboard 200, and of hardware computing capabilities of the device 300 executing the computer program which provides generating of the said GUI.

The device 300 in this application can be represented by, but not limited to, the following: smart phone, smartwatch, communicator, hand-held computer (HHC), phablet, laptop, and any other device type suitable for generating of GUI and recognizing of user interaction.

The claimed invention can be widely used as the new method of data entering and displaying on electronic devices performing control through a touch display.

Information on the claimed invention embodiments given in these application materials shall be construed neither as information limiting other particular embodiments of the claimed invention nor as information breaking the disclosure limits of the application information, and which shall be obvious to regularly qualified persons skilled in the art for whom this technical solution was meant.

I claim:

1. A method of receiving a user-input as a string of symbols on a touch screen of an electronic device and displaying the string of symbols on the touch screen, the method executable by the electronic device, the method comprising:
    displaying on the touch screen a plurality of virtual keys such that the plurality of virtual keys occupies an entirety of the touch screen, each of the plurality of virtual keys having a boundary and the boundaries of the plurality of virtual keys have contact zones with each other, a given one of the plurality of virtual keys having:
        an indication of an input symbol that can be inputted by actuating the given one of the plurality of virtual keys; and
        a field for displaying data,
        both the indication of the input symbol and the field for displaying data being positioned inside the boundary of the given one of the plurality of virtual keys;
    receiving an indication of a user interaction with a user-actuated virtual key of the plurality of virtual keys, the user-actuated virtual key being associated with a desired symbol; and
    displaying the desired symbol in the field of a virtual key of the plurality of virtual keys;
    wherein the field for displaying data of each of the plurality of virtual keys does not obstruct the input symbol of any of the plurality of virtual keys, and wherein the fields for displaying data of a first virtual key and a second virtual key define a continuous field for displaying data across the boundaries of the first and second virtual keys.

2. The method of claim 1, wherein the field for displaying data of at least one of the plurality of virtual keys is operable to display a plurality of desired symbols without any one of the plurality of desired symbols intercrossing with any other one of the plurality of desired symbols.

3. The method of claim 1, wherein the desired symbol is part of the string of symbols, a sub-portion of which has been entered and wherein the displaying the desired symbol comprises displaying the desired symbol logically sequentially to the sub-portion.

4. The method of claim 3, wherein the fields for displaying data of the first virtual key and the second virtual key define a continuous horizontal field for displaying data across the boundaries of the first and second virtual keys, and wherein the displaying the desired symbol logically sequentially to the sub-portion comprises displaying the string of symbols in the continuous horizontal field.

5. The method of claim 4, wherein the continuous horizontal field for displaying data is displayed in one of: a position above and a position under the input symbols of the first and second virtual keys.

6. The method of claim 3, wherein the fields for displaying data of the first virtual key and the second virtual key define a continuous vertical field for displaying data across the boundaries of the first and second virtual keys, and wherein the displaying the desired symbol logically sequentially to the sub-portion comprises displaying the string of symbols in the continuous vertical field.

7. The method of claim 6, wherein the continuous vertical field for displaying data is displayed in one of: a position to the left of and a position to the right of the input symbols of the first and second virtual keys.

8. The method of claim 1, wherein the displaying of the virtual keys on the touch screen comprises displaying the boundary of a first virtual key contiguous with the boundary of a second virtual key in a horizontal direction.

9. The method of claim 1, wherein the displaying of the virtual keys on the touch screen comprises displaying the boundary of a first virtual key contiguous with the boundary of a second virtual key in a vertical direction.

10. The method of claim 1, wherein:
    the plurality of virtual keys is a sub-set of all possible displayable virtual keys;
    the plurality of virtual keys further including a function key; and
    the method further comprises:
        receiving an indication of a user interaction with the function key, and
        in response to receiving the indication of the user interaction with the function key, displaying a different sub-set of all of the possible displayable virtual keys on the touch screen.

11. A device comprising a touch screen, a processor, and a memory storing therein machine-readable commands, which, when executed by the processor, implement a plurality of steps, the steps comprising:
    displaying on the touch screen a plurality of virtual keys such that the plurality of virtual keys occupies an entirety of the touch screen, each of the plurality of virtual keys having a boundary and the boundaries of the plurality of virtual keys have contact zones with each other, a given one of the plurality of virtual keys having:
        an indication of an input symbol that can be inputted by actuating the given one of the plurality of virtual keys; and
        a field for displaying data,
        both the indication of the input symbol and the field for displaying data being positioned inside the boundary of the given one of the plurality of virtual keys;
    receiving an indication of a user interaction with a user-actuated virtual key of the plurality of virtual keys, the user-actuated virtual key being associated with a desired symbol; and
    displaying the desired symbol in the field of a virtual key of the plurality of virtual keys;
    wherein the field for displaying data of each of the plurality of virtual keys does not obstruct the input symbol of any of the plurality of virtual keys, and wherein the fields for displaying data of a first virtual key and a second virtual key define a continuous field for displaying data across the boundaries of the first and second virtual keys.

12. The device of claim 11, wherein the field for displaying data of at least one of the plurality of virtual keys is operable to display a plurality of desired symbols without any one of the plurality of desired symbols intercrossing with any other one of the plurality of desired symbols.

13. A system comprising a touch screen, a processor, and a memory containing machine-readable commands, which, when executed by the processor, implement a plurality of steps, the steps comprising:

displaying on the touch screen a plurality of virtual keys such that the plurality of virtual keys occupies an entirety of the touch screen, each of the plurality of virtual keys having a boundary and the boundaries of the plurality of virtual keys have contact zones with each other, a given one of the plurality of virtual keys having:

an indication of an input symbol that can be inputted by actuating the given one of the plurality of virtual keys; and a field for displaying data, both the indication of the input symbol and the field for displaying data being positioned inside the boundary of the given one of the plurality of virtual keys;

receiving an indication of a user interaction with a user-actuated virtual key of the plurality of virtual keys, the user-actuated virtual key being associated with a desired symbol; and displaying the desired symbol in the field of a virtual key of the plurality of virtual keys;

wherein the field for displaying data of each of the plurality of virtual keys does not obstruct the input symbol of any of the plurality of virtual keys, and wherein the fields for displaying data of a first virtual key and a second virtual key define a continuous field for displaying data across the boundaries of the first and second virtual keys.

14. The system of claim 13, wherein the field for displaying data of at least one of the plurality of virtual keys is operable to display a plurality of desired symbols without any one of the plurality of desired symbols intercrossing with any other one of the plurality of desired symbols.

* * * * *